(12) United States Patent
Chiaroni et al.

(10) Patent No.: US 7,031,608 B2
(45) Date of Patent: Apr. 18, 2006

(54) OPTICAL PACKET NODE AND OPTICAL PACKET ADD DROP MULTIPLEXER

(75) Inventors: Dominique Chiaroni, Antony (FR); Denis Penninckx, Nozay (FR); Nicolas Le Sauze, Bures-sur-Yvette (FR); Amaury Jourdan, Sevres (FR); Olivier Audouin, Savigny sur Orge (FR); Emmanuel Dotaro, Verrieres le Buisson (FR); Claude Artigue, Bourg la Reine (FR)

(73) Assignee: Alcatel, Paris (FR)

( * ) Notice: Subject to any disclaimer, the term of this patent is extended or adjusted under 35 U.S.C. 154(b) by 645 days.

(21) Appl. No.: 10/078,392

(22) Filed: Feb. 21, 2002

(65) Prior Publication Data

US 2002/0131118 A1    Sep. 19, 2002

(30) Foreign Application Priority Data

Mar. 16, 2001    (EP)    ................... 01440076

(51) Int. Cl.
 *H40J 14/02* (2006.01)
 *H40B 10/20* (2006.01)
 *H40B 10/08* (2006.01)

(52) U.S. Cl. .................. 398/79; 398/59; 398/82; 398/97

(58) Field of Classification Search ............... 385/7; 370/535, 543, 538, 218, 245, 244, 314, 466; 398/43, 79, 59, 82, 97
See application file for complete search history.

(56) References Cited

U.S. PATENT DOCUMENTS 5,796,501 A * 8/1998 Sotom et al. ................. 398/59

6,512,613 B1 * 1/2003 Tanaka et al. ................ 398/97
6,556,321 B1 * 4/2003 Milton et al. ................. 398/79
6,590,681 B1 * 7/2003 Egnell et al. ................. 398/82

FOREIGN PATENT DOCUMENTS

| EP | 1 009 120 A2 | 6/2000 |
| EP | 1 065 820 A2 | 1/2001 |
| WO | WO 00/49752 | 8/2000 |

OTHER PUBLICATIONS

Harada K et al: "Optical Path Cross-Connect System Using Matrix Wavelength Division Multiplex Scheme" IEICE Transactions on Electronics, Institute of Electronics Information and Comm. Eng. Tokyo, Japan, vol. E82-C, No. 2, Feb. 1999, pp. 292-295.

(Continued)

*Primary Examiner*—Kenneth Vanderpuye
*Assistant Examiner*—Leming Wang
(74) *Attorney, Agent, or Firm*—Sughrue Mion, PLLC

(57) ABSTRACT

An optical packet node for receiving and transmitting optical packets is disclosed. A multiwavelength band splitting device splits received optical packets transmitted via multiwavelength bands into at least three groups, each group including one multiwavelength band. A multiwavelength band combining device combine the three groups of multiwavelength bands. At least two optical packet add drop multiplexers are placed between the multiwavelength band splitting device and the multiwavelength band combining device. Each optical packet add drop multiplexer adds and drops at least one individual wavelength to a respective multiwavelength band group. A load balancing stage is connected to the optical packet add drop multiplexers to provide an interconnection between at least two wavelength bands.

13 Claims, 9 Drawing Sheets

OTHER PUBLICATIONS

Harada K et al.: "Hierarchical Optical Path Cross-Connect Systems for Large scale WDM Networks", OFC/IOOC '99 Optical Fiber Communication Conference/International Conference on Integrated Optics and Optical Fiber Communication. San Diego, CA Feb. 21, 1999, Optical Fiber Communication Conference/International Conference on Integrated OP, Feb. 21, 1999, pp. WM55-1-WM55-3 (357-358).

* cited by examiner

OPTICAL PACKET NODE AND OPTICAL PACKET ADD DROP MULTIPLEXER

BACKGROUND OF THE INVENTION

1. Field of the Invention

This invention relates to optical packet transmission. The invention is based on a priority application EP 01440076.6, which is hereby incorporated by reference.

2. Background of the Invention

The increased demand for high speed communication networks transmitting voice and/or data at high data rates provided several alternatives of networks; electric networks like SDH or ATM, electro-optical networks, e.g. SONET, optical transmission of SDH, ATM, and all-optical networks, the latter not being implemented yet. The network topologies could be ring, star, mesh, bus, etc. In the optical domain both voice and data are generally transmitted via optical fibers using wavelength division multiplex (WDM) or dense WDM (DWDM). At nodes within the network add drop multiplexers are used to drop received information and to add new information to be transmitted over the network. Cross-connects are used to switch information. It is a wish not to perform optical to electrical conversion and electrical to optical conversion for the information to be forwarded in an add drop multiplexer. At the same time adding and dropping of information should be as simple as possible and interferences should be minimized.

Some examples of implementations can be found in the following patent applications.

In EP 1 009 120 A2 a band optical add drop multiplexer for a wavelength multiplexed communication network is discloses, which comprises a wide-band demultiplexer for receiving an input multichannel optical signal and separating same into a first multichannel optical signal of a first band, e.g. for dropping purpose, and a second multichannel optical signal of a second band, e.g. for forwarding purpose; and a wide-band multiplexer for combining a third multichannel signal of a third band, e.g. for adding purpose, with said second multichannel optical signal to obtain an output multichannel optical signal.

In EP 1 065 820 A2 an add drop arrangement capable of adding and dropping at least one optical channel of a wavelength division multiplexed (WDM) signal in a WDM ring network having a plurality of nodes connected over an optical fiber facility is disclosed. The arrangement comprises in at least one of the plurality of nodes a broadband optical coupler including a first input coupled to the optical fiber facility for receiving the WDM signal, a first output for passing a topped first portion of optical signal power of the WDM signal, and a second output for passing a second portion of optical signal power of the WDM signal to the WDM ring network, a receiver coupled to the first output, the receiver capable of extracting at least one optical channel from the tapped first portion, and a transmitter coupled to a second input of the broadband optical coupler, the transmitter capable of supplying an optical channel to be added to the WDM signal; and in at least one of the plurality of nodes, a means for preventing re-circulation of an optical channel to substantially reduce interference between optical channels transported in the WDM ring network.

In WO 00/49752 an add drop multilexer is discloses which has a group filter that divides an incoming WDM signal into several channel groups of corresponding adjacent WDM channels. A reconfiguration module is ferd to each channel group. A first type of module makes it possible to perform manual configuration of the add drop channels and the coupled WDM channels while a second type of module makes it possible to carry out remote configuration. A fourth type of module enables remote configuration of the drop continue channels.

Each of the above examples of implementations has his advantages and disadvantages. A alternative solution is looked for.

SUMMARY OF THE INVENTION

An optical packet node for receiving and transmitting optical packets is presented. The optical packet node could e.g. be an access node of a ring optical network. The network topologies could be star, mesh, bus, etc. WDM or DWDM multiwavelength bands are used to transmit information. The invention provides a network solution to transport efficiently voice and/or data traffic in the metro access area, with limited opto-electronic conversion to support high bit rates at low cost.

The optical packet node comprises a multiwavelength band splitting device for splitting received optical packes transmitted via multiwavelength bands into at least three groups, each group including one multiwavelength band. One multiwavelength band includes at least two wavelengths. The multiwavelength band splitting device includes e.g. a demultiplexer, a filter, or a coupler. The multiwavelength band splitting device serves to select individual groups, which are transmitted together over the same optical fibre link. Each group can then be processed individually.

The optical packet node further comprises a multiwavelength band combining device for combining said at least three groups of multiwavelength bands. The multiwavelength band combining device includes e.g. a multiplexer, or a combiner. The multiwavelength band combining device is the counterpart to the multiwavelength band splitting device. It serves to combine individual groups in order to transmit the combined groups together over the same optical fibre link.

The optical packet node is placed between two optical fibres on which optical packets are transported via groups of multiwavelength bands. It serves to forward optical packets with or without intermediate processing from one optical link to the other. In the optical packet node individual groups are separated.

The optical packet node further comprises at least two optical packet add drop multiplexers, each optical packet add drop multiplexer being placed between said multiwavelength band splitting device and said multiwavelength band combining device, and each optical packet add drop multiplexer serving to add and to drop at least one individual wavelength to a respective group of a multiwavelength band. One separated individual group can be forwarded through an optical packet add drop multiplexer. In the multiplexer individual wavelengths included in the group are separated. Part of the separated individual wavelengths may be dropped, part may be forwarded unchanged. New information to be transmitted will be added via optical packets, which will be transmitted using the dropped wavelengths.

The optical packet node further comprises a load balancing stage being connected to at least two of said optical packet add drop multiplexers, to provide an interconnection between at least two wavelength bands. The load balancing stage is a new module, which could perform several tasks. One is a management function. In case of an over loading of one group, information to be transmitted could be shifted to another group. This leads to a great flexibility in using the complete transmission capacity. Blocking and over loading of individual groups is prevented. The load balancing stage could in addition be used as a wavelength converter. Optical packets transmitted over a first wavelength of a first group could be forwarded to a second wavelength of a second group, the second wavelength being e.g. not the same wavelength as the first wavelength. Rotation of wavelengths in a ring network may be used. In addition, test sequences may be received over one wavelength of a group and forwarded over another wavelength of another group after wavelength conversion. Another application could be that data transmission having low priority could be dropped and intermediately stored in the load balancing stage. In case of available bandwidth the stored data packet could be transmitted over the available wavelength, which could be any of the wavelengths of all groups. High priority data will be served first, e.g. added forwarded, transmitted, and low priority data will be served afterwards filling the gaps that the high priority data offers.

In an preferred embodiment of the invention the load balancing stage includes an electric packet switch to provide a load balancing between the data packets to be added and transmitted and the available wavelength capacity.

Advantageously the optical packet node further comprises at least two electric interface modules being connected to the load balancing stage to provide the data packets to be added and transmitted. Through the load balancing stage each interface module has access to each group, so that each data packet could be transmitted over each wavelength of each group. In a practical implementation one interface module will be assigned to one optical packet add drop multiplexer. This will minimize the amount of switching in the load balancing stage. In case one interface module has to send more data than the data being dropped from the assigned optical packet add drop multiplexer the load balancing stage can forward part of the data to another optical add drop multiplexer, which has actually available transmission capacity.

Each interface module provides e.g. packet format adaptation, classification, contension resolution, and resequencing.

In a further preferred embodiment of the invention the load balancing stage is telemetrically programmable. The center of an optical ring network, e.g. located in a hub, could determine and manage the load balancing via a supervisory channel on the network itself or via a network management. The center will then be able to control the whole network. If e.g. the transit stage and the add stage of an optical packet add drop multiplexer do not work, the center will be able to drop individual wavelength, and forward those dropped wavelengths through the balancing stage and the add stage of another optical packet add drop multiplexer.

The invention further presents an optical packet add drop multiplexer for receiving and transmitting optical packets and to add and to drop at least one individual wavelength to a group of one multiwavelength band.

The optical packet add drop multiplexer comprises:
a drop stage to drop at least one individual wavelength of said group of one multiwavelength band,
a transit stage to forward those wavelengths of said group of one multiwavelength band which were not dropped,
an add stage to add at least one individual wavelength to said group of one multiwavelength band,
a wavelength band coupler to forward X% of the optical signal power of the received optical packets to a first output, and to forward 100–X% of the optical signal power of the received optical packets to a second output, the first output being connected to the transit stage and the second output being connected to the drop stage, and
a coupler to couple the output signals of the transit stage and the output signals of the add stage.

In a preferred embodiment of the invention the optical packet add drop multiplexers transit stage comprises a series connection of
a multiwavelength band splitting device for splitting received optical packes transmitted via said group of one multiwavelength band into individual wavelengths,
a wavelength selector to select the wavelengths to be forwarded and the wavelengths not to be forwarded, and
a multiwavelength band combining device for combining said selected wavelengths to be forwarded,
wherein said drop stage comprises a series connection of
a multiwavelength band splitting device for splitting received optical packes transmitted via said group of one multiwavelength band into individual wavelengths, and
a wavelength selector to select the wavelengths to be dropped and the wavelengths not to be dropped, and
wherein said add stage comprises a series connection of
a wavelength selector to select the wavelengths to be added and the wavelengths not to be added, and
a multiwavelength band combining device for combining said selected wavelengths to be added.

Advantageously the optical packet add drop multiplexer further comprises a control unit to control the selection of the wavelengths to be dropped, those to be forwarded, and those to be added.

The inventive optical packet node could include at least one inventive optical packet add drop multiplexer, and a common synchronization and management unit to provide synchronization and management to all said optical packet add drop multiplexers.

In a further preferred embodiment the optical packet node is characterized in that instead of at least two optical packet add drop multiplexers at least two optical packet cross-connects are used. Each optical packet add drop multiplexer is e.g. implemented as a module. Each optical packet cross-connect is e.g. implemented as a module. The multiplexer modules are exchanged by the cross-connect modules. The optical packet node therefore comprises e.g. a demultiplexer, a number of cross-connect modules, and a multiplexer. The optical packet node further comprises the load balancing stage being connected to e.g. all cross-connect modules, to provide an interconnection between all wavelength bands. Data received in one wavelength band can therefore e.g. be forwarded in another wavelength band. Electric data to be transmitted can be inserted in each wavelength band. The selection of the wavelength band is e.g. done dependent on the actual load.

In a further preferred embodiment the optical packet node is characterized in that instead of said at least two optical packet add drop multiplexers at least one optical packet cross-connect and at least one optical packet add drop multiplexer are used. Each optical packet add drop multiplexer is e.g. implemented as a module. Each optical packet cross-connect is e.g. implemented as a module. The multiplexer modules are partly exchanged by the cross-connect modules. The optical packet node therefore comprises e.g. a demultiplexer, a number of cross-connect modules, a number of multiplexer modules, and a multiplexer. The optical packet node further comprises the load balancing stage being connected to e.g. all cross-connect modules and all multiplexer modules, to provide an interconnection between all wavelength bands. Data received in one wavelength band, e.g. through a multiplexer module, can therefore e.g.

be forwarded in another wavelength band, e.g. through a cross-connect module. Electric data to be transmitted can be inserted in each wavelength band. The selection of the wavelength band is e.g. done dependent on the actual load.

BRIEF DESCRIPTION OF THE DRAWINGS

The features and advantages of exemplary embodiments of the invention will be apparent from the following more particular description, as illustrated in the appended drawing, where.

BEST MODE FOR CARRYING OUT THE INVENTION

Figure 1:
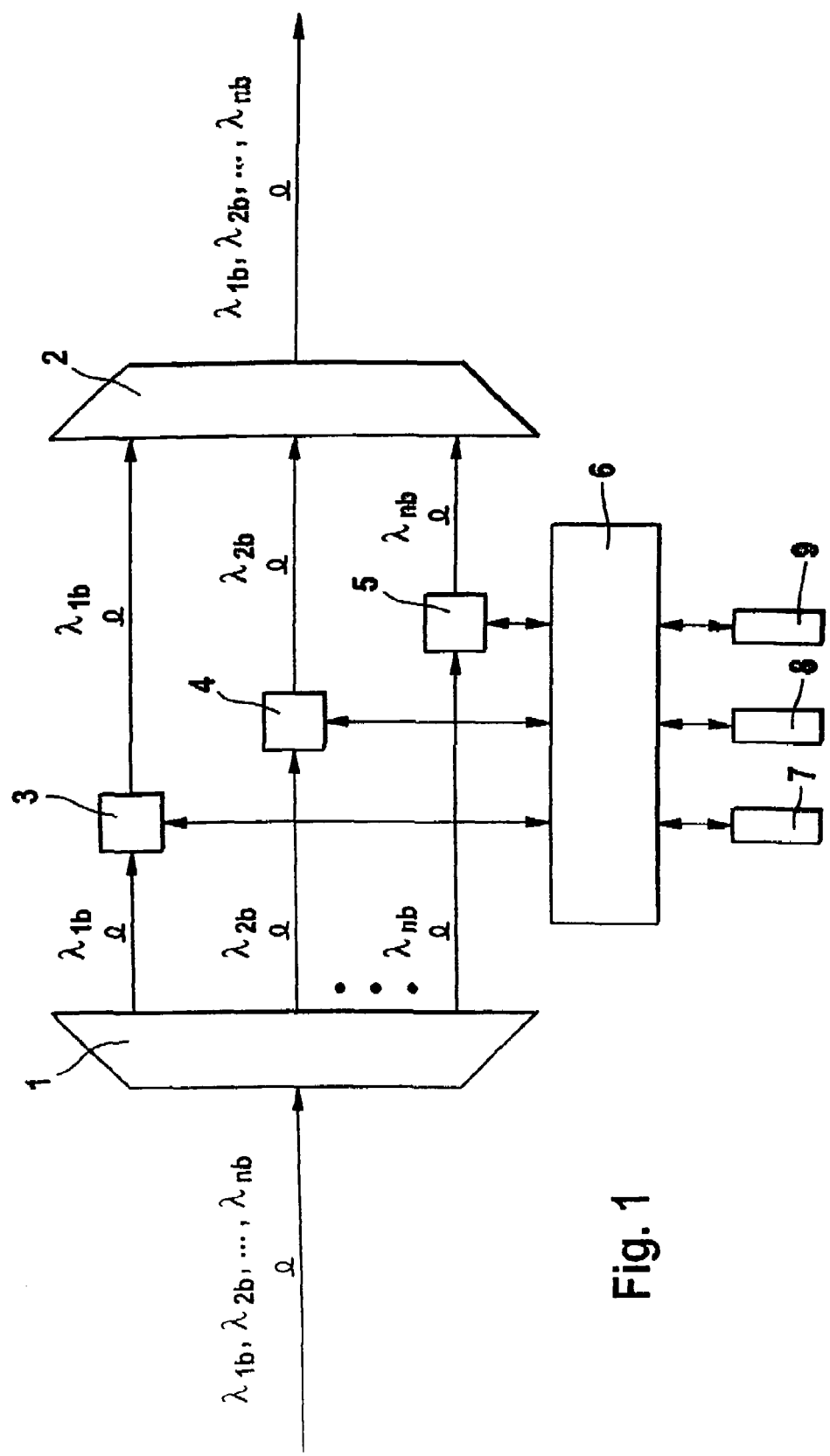
FIG. 1 shows a schematic diagram of an inventive optical packet node.

FIG. 1 shows a schematic diagram of an inventive optical packet node. The optical packet node includes a demultiplexer 1, a multiplexer 2, for the sake of simplicity three optical packet add drop multiplexer 3, 4, 5, a load balancing stage 6, and the sake of simplicity three interface modules 7, 8, 9.

Demultiplexer 1 has one input being connected to an optical fibre, and n outputs each of which being connected to one optical packet add drop multiplexer 3, 4, 5. On the optical fibre groups of multiwavelength bands are transmitted. In sum n wavelength bands $\lambda_{1b}, \lambda_{2b}, \lambda_{nb}$ are transmitted, each wavelength band $\lambda_{1b}, \lambda_{2b}, \lambda_{nb}$ including several wavelengths. For example, 8 groups each including 10 wavelengths are transmitted together over one single optical fibre, so that in total 80 wavelengths are transmitted. In the demultiplexer 1 individual wavelength bands are separated. Wavelength band $\lambda_{1b}$ corresponding to group 1 is forwarded to optical packet add drop multiplexer 3, wavelength band $\lambda_{2b}$ corresponding to group 2 is forwarded to optical packet add drop multiplexer 4, wavelength band $\lambda_{nb}$ corresponding to group n is forwarded to optical packet add drop multiplexer 5.

Each optical packet add drop multiplexer 3, 4, 5 is able to drop optical packets transmitted over an individual wavelength, to add optical packets using the dropped wavelengths, and to forward received optical packets unchanged. The forwarded and the added optical packets will be transmitted to multiplexer 2.

Multiplexer 2 has n inputs each of which being connected to one optical packet add drop multiplexer 3, 4, 5, and one output being connected to one optical fibre. Multiplexer 2 multiplexes all received optical packets and transmits them together over the optical fibre.

Alternatively, at least one group could be transmitted from demultiplexer 1 to multiplexer 2 without being interconnected via an optical packet add drop multiplexer 3, 4, 5. Those groups, which have no optical packets to be dropped could therefore be forwarded without interruption.

The load balancing stage 6 provides an interconnection between the optical packet add drop multiplexers 3, 4, 5, between the interface modules 7, 8, 9, and between the optical packet add drop multiplexers 3, 4, 5 on the one side and the interface modules 7, 8, 9 on the other side. Load balancing stage 6 e.g. includes an electric switch and a memory. The memory could be used as an intermediate storage.

Normally the number of interface modules corresponds to the number of optical packet add drop multiplexers. Due to the use of the load balancing stage 6 there is no necessity that their number has to be equal. Each interface module 7, 8, 9 could be connected with each optical packet add drop multiplexer 3, 4, 5 via the electric switch. Nevertheless, one interface module 7, 8, 9 could be assigned to one optical packet add drop multiplexer 3, 4, 5, e.g. interface module 7 being assigned to optical packet add drop multiplexer 3, 8 assigned to 4, and 9 assigned to 5.

Optical packets dropped in optical packet add drop multiplexer 3 will be forwarded to interface module 7 for further processing. Data packets of interface module 7 to be transmitted will be forwarded to optical packet add drop multiplexer 3 to be added as optical packets. If the amount of data packets of interface module 7 to be transmitted is greated than the amount of optical packets dropped in optical packet add drop multiplexer 3, then these data packets will be switched to another optical packet add drop multiplexer, which has available transmission capacity. E.g. the amount of data packets of interface module 8 to be transmitted is less than the amount of optical packets dropped in optical packet add drop multiplexer 4. Then optical packet add drop multiplexer 4 has unused capacity and could forward data packets of interface module 7. If no unused transmission capacity is available the data packets to be transmitted could be intermediately stored in the load balancing stage 6 waiting for a gap.

Load balancing stage 6 could in addition be used to transmit data packets between interface modules 7, 8, 9, and between optical packet add drop multiplexers 3, 4, 5.

Figure 2:
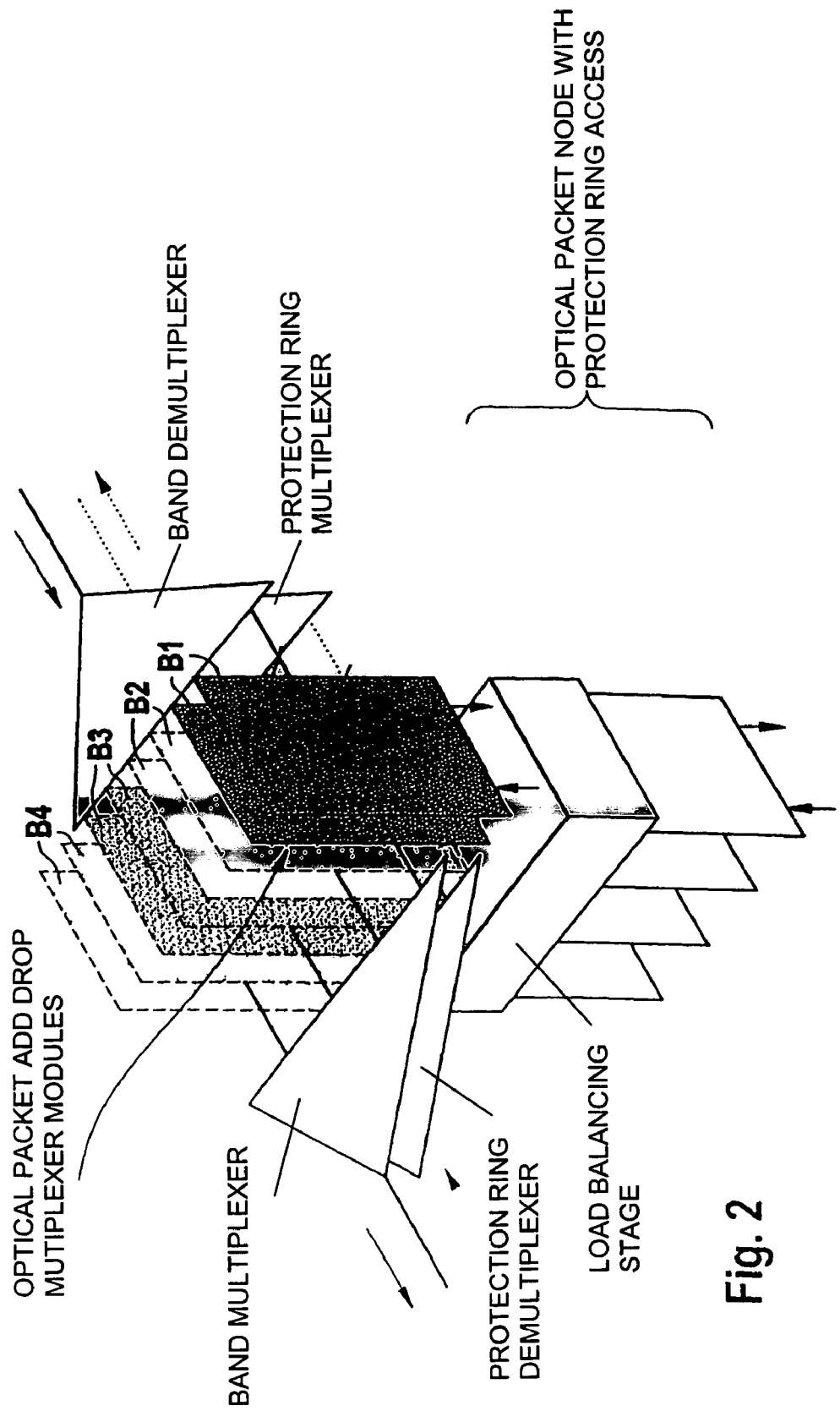
FIG. 2 shows a three dimensional structure of an optical packet node with protection ring access.

FIG. 2 shows a three dimensional structure of an optical packet node with protection ring access. An optical packet add drop multiplexer structure is presented, which is competitive with respect to opto-electronic structures and compatible with circuit and virtual circuit switching in a ring MAN topology. The modularity is another point to offer a full flexibility at a lower cost: upgrade only with the demand.

The optical packet node includes a band demultiplexer for the main fibre of the ring, a number of optical packet add drop multiplexer modules for the main fibre traffic, and a band multiplexer for the main fibre of the ring. Additionally, the optical packet node includes a band demultiplexer for the protection ring, a number of optical packet add drop multiplexer modules for the protection traffic, and a band multiplexer for the protection ring. The optical packet node further includes a load balancing stage connected to all optical packet add drop multiplexers, and a number of electronic interfaces for packet format adaptation, classification, and memory. The load balancing stage includes a label switch router. The protection ring could of course also be used as a second main fibre allowing the optical packet node perform bidirectional optical packet transmission. In addition to data transmission the load balancing stage could be used to transmit back test signals received via the one main line over the other main line in order to have e.g. a test signal analysis in a neighbouring node or in the hub.

Switching is minimized through an optimised utilisation of optical packet switching techniques for the transit, the drop and the add ports, and electrical packet switching for the load balancing in case of full load.

The modular architecture of partitioning the wavelength domain into bands allows a progressive increase of the ring node capacity resulting in full flexibility.

Adaptation interfaces are used to convert IP datagrams/ATM cells into optical packets and the reverse only when it is necessary: for the add and for the drop ports.

The optical packet ring node in basically composed of:
one fully modular optical part called OPADM (Optical Packet Add Drop Multiplexer). One module can process one wavelength band. Protection plans are used to ensure the connection.
one load balancing stage including some memory and offering the possibility to give access to other wavelength bands in case of over loading on the main wavelength band used. For the optical drop port this stage re-affect the packet to its respective electrical drop port.
one interface stage providing packet format adaptation, classification, contention resolution, resequencing.

Each OPADM is basically composed of:
one transit stage,
one drop stage,
one add stage.

Figure 3:
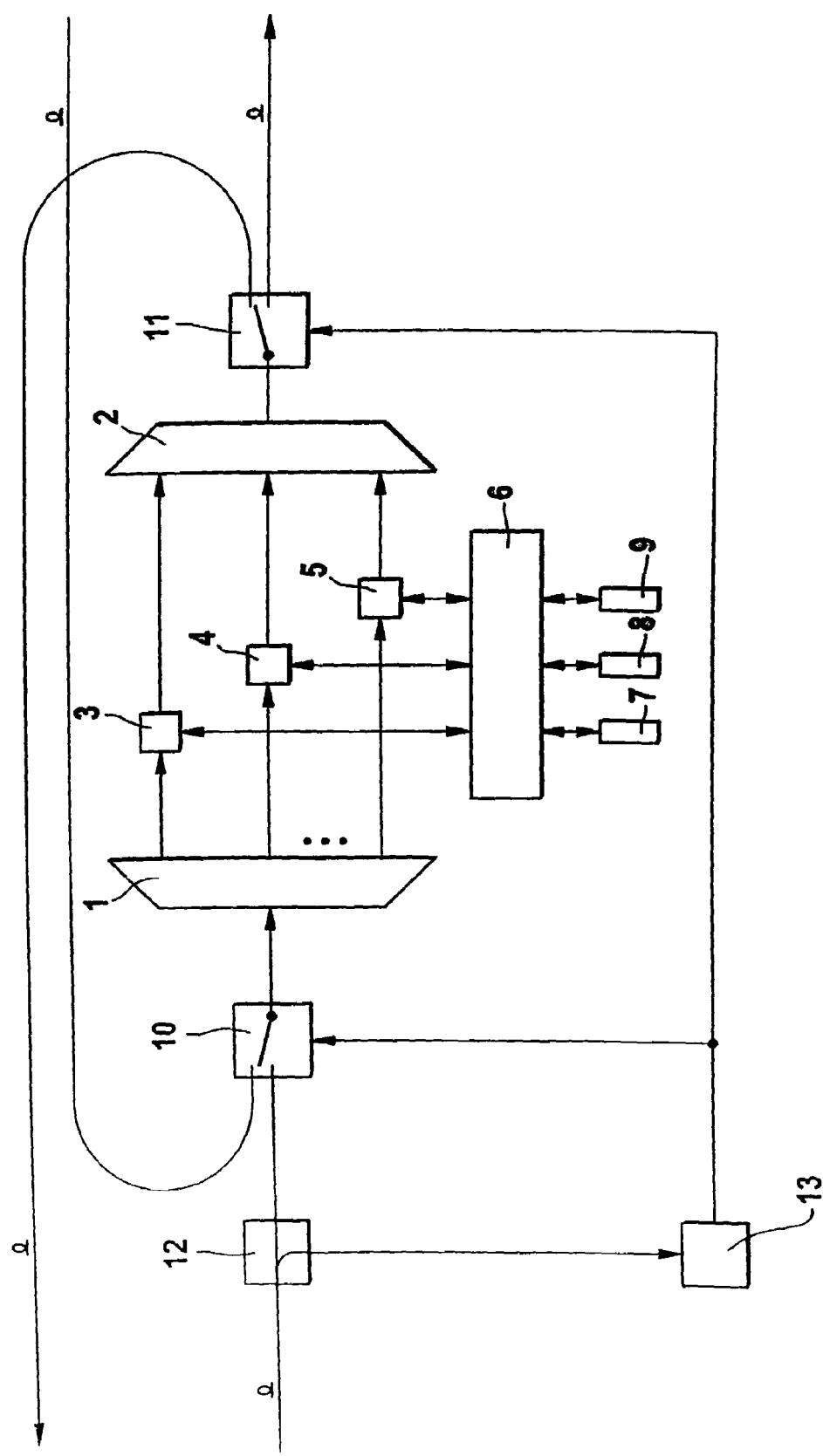
FIG. 3 shows a schematic diagram of an inventive optical packet node with protection ring access.

FIG. 3 shows a schematic diagram of an inventive optical packet node with protection ring access. The optical packet node is an alternative to the optical packet node of FIG. 2 for both cases main fibre plus protection ring. Optical packet node of FIG. 3 corresponds to optical packet node of FIG. 1, additionally including two switches 10, 11, a coupler 12, an a detector 13. Via coupler 12 and detector 13 a supervision of the main fibre is performed. If optical packets are received via the main fibre the switches will be controlled in such a way that demultiplexer 1 and multiplexer 2 are connected to the main fibre. If no or disturbed optical packets are received via the main fibre the switches will be controlled in such a way that demultiplexer 1 and multiplexer 2 are connected to the protection ring. Compared to FIG. 2 this saves hardware, e.g. n optical packet add drop modules, one demultiplexer, and one multiplexer. Instead only four low cost elements are needed.

Figure 4:
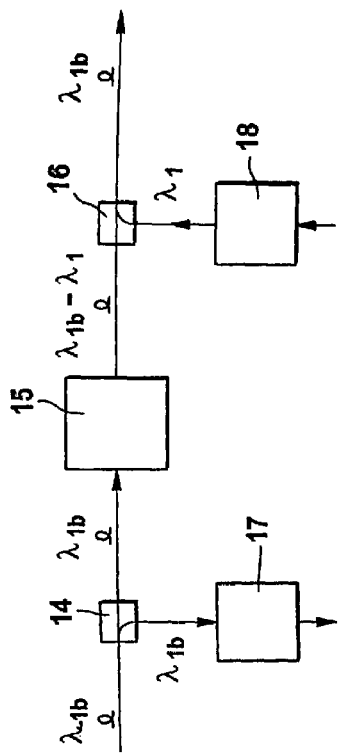
FIG. 4 illustrates a schematic diagram of an inventive optical packet add drop multiplexer.

FIG. 4 illustrates a schematic diagram of an inventive optical packet add drop multiplexer. The optical packet add drop multiplexer includes an asymmetric coupler 14, a transit stage 15, a coupler 16, a drop stage 17, and an add stage 18.

Asymmetric coupler 14 has one input being connected to an optical fibre, and two outputs, one output being connected to the transit stage and the other output being connected to the drop stage. The asymmetric coupler 14 receives optical packets transmitted via a multiwavelength band $\lambda_{1b}$ including several wavelengths. Part of the optical signal power of the received optical packets, e.g. X%, is forwarded to the transit stage 15; the rest, e.g. 100–X%, is forwarded to the drop stage 17. Therefore, both the transit stage 15 and the drop stage 17 receive all optical packets.

In the drop stage 17 individual wavelengths are dropped. The drop stage 17 is able to drop at least one wavelength, e.g. $\lambda_1$, out of the received multiwavelength band $\lambda_{1b}$. Optical packets transmitted over the dropped wavelength are then opto-electical converted and forwarded to an interface module, in which further processing takes place.

The transit stage 15 forwards only those wavelengths of the received multiwavelength band $\lambda_{1b}$, which have not been dropped in the drop stage. If e.g. only $\lambda_1$ is dropped all the rest, $\lambda_{1b}$–$\lambda_1$, is forwarded to coupler 16.

Coupler 16 has two inputs, one being connected to the transit stage 15 and the other being connected to the add stage 18, and one output being connected to an optical fibre. Coupler 16 couples the signals received from the add stage 18 and the signals received from the transit stage to provide a common signal to be transmitted via the optical fibre.

Add stage 18 generates the optical packets to be added to the transit signals. Optical packets to be transmitted can only be transmitted on wavelengths, which have been dropped. E.g., if $\lambda_1$ is dropped in drop stage 17, $\lambda_1$ could be generated in add stage 18 and transmitted to coupler 16.

Figure 5:
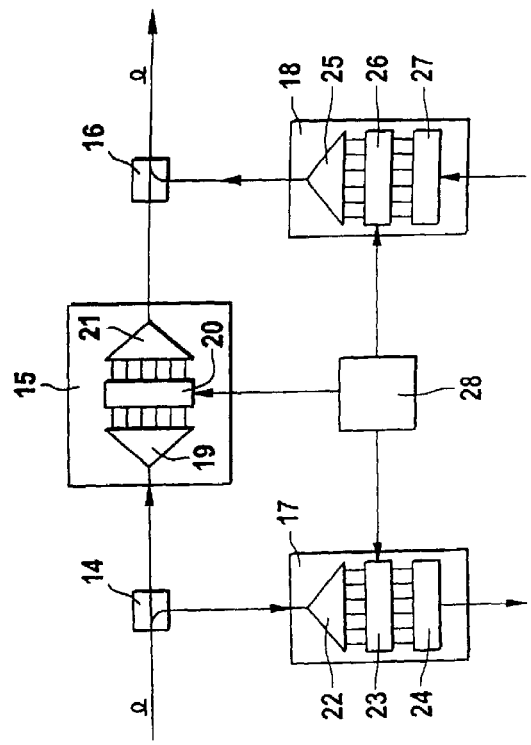
FIG. 5 illustrates an example of a more detailed diagram of the optical packet add drop multiplexer of FIG. 4.

FIG. 5 illustrates an example of a more detailed diagram of the optical packet add drop multiplexer of FIG. 4. Drop stage 17 includes a demultiplexer 22, a photodiode array 23, and a memory 24. Demultiplexer 22 demultiplexes the incoming multiwavelength band into individual wavelengths. The photodiode array 23 includes a number of photodiodes corresponding to the number of wavelengths. Each photodiode can be switched on and off by control unit 28. Via the control unit 28 a decision can be taken, which wavelength will be dropped. The dropped wavelength is intermediately stored in memory 24.

Transit stage 15 includes a demultiplexer 19, a selector 20, and a multiplexer 21. Demultiplexer 19 demultiplexes the incoming multiwavelength band into individual wavelengths. Selector 20 selects the wavelengths to be forwarded and the wavelengths not to be forwarded. Selector 20 is controlled by control unit 28. Wavelengths, which were dropped could either be forwarded in transit stage 15 or not. In case the dropped wavelengths transport e.g. a broadcast signal which shall be transmitted to a plurality of nodes the dropped wavelength will be forwarded in transit stage 15 to transmit the broadcast signal also to the neighbouring node and even further. In case the dropped wavelengths transport no relevant information for further nodes they could be dropped, and normally they will be dropped.

Add stage 18 includes a multi-wavelength source 27 comprising an ILM array, optical gates 26 and a multiplexer 25. In multi-wavelength source 27 all relevant wavelengths are generated. Optical gates 26 are controlled by control unit 28. Control unit 28 selects the wavelengths to be added. Only those wavelengths could be added, which have not been forwarded by transit stage 15.

In one embodiment e.g. wavelengths $\lambda_1$ and $\lambda_2$ carrying received optical packets are dropped and not forwarded in transit stage 15, and wavelengths $\lambda_1$ and $\lambda_2$ carrying new optical packets are added. In one embodiment e.g. wavelengths $\lambda_2$ and $\lambda_4$ carrying received optical packets are dropped and not forwarded in transit stage 15, and wavelength $\lambda_2$ carrying new optical packets is added. The selection of the wavelengths to be dropped, to be forwarded, and to be added may vary during operation, e.g. exchanged under local or telemetry control, e.g. via MAC or IP router.

Figure 6:
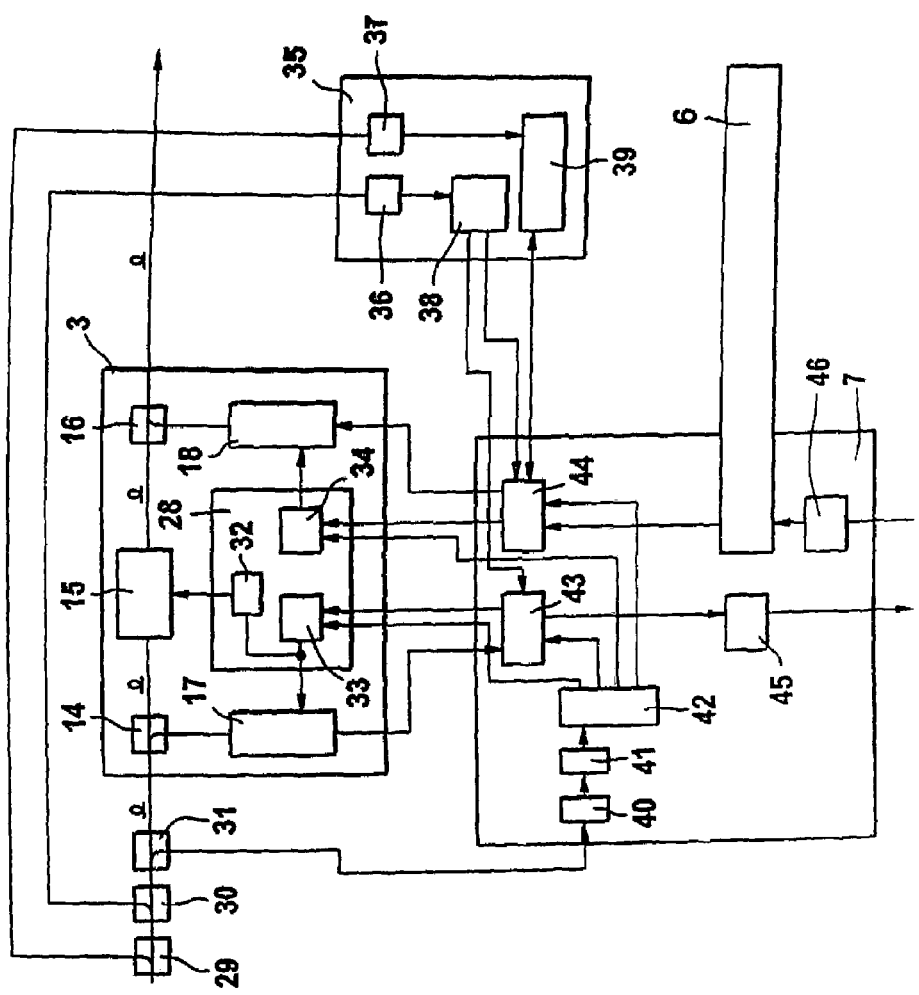
FIG. 6 illustrates an example of a more detailed diagram of part of the optical packet node of FIG. 1.

FIG. 6 illustrates an example of a more detailed diagram of part of the optical packet node of FIG. 1. The optical packet node of FIG. 6 includes optical packet add drop multiplexer 3, load balancing stage 6, and interface module 7. It further includes three couplers 29, 30, 31 and a common synchronization and management unit 35.

Couplers 29 and 30 couple out part of the optical signal power of the received multiwavelength band and submit it to common synchronization and management unit 35.

Coupler 31 couples out part of the optical signal power of the received multiwavelength band and submits it to interface module 7.

Interface module 7 includes a series connection of an optical parallel to serial interface 40, an optical receiver 41, and a processing unit 42; the processing unit 42 being adapted to perform header analysis and wavelengths assignment. The header e.g. includes the address of the optical packet node as a destination address of an optical packet and the corresponding wavelength on which the optical packet is transmitted. Thereof the wavelengths to be dropped result.

Interface module 7 further includes a receiver part 43, a transmitter part 44, an extraction unit 45, and a generation unit 46. Both the receiver part 43 and the transmitter part 44 serve for synchronization and memory purpose. Data packets to be dropped are extracted in the extraction unit 45, which also serves for resequencing. Data packets to be added are generated in the generation unit 46. Generation unit 46 and transmitter part 44 are interconnected via load balancing stage 7.

Common synchronization and management unit 35 includes two optical receivers 36 and 37, a synchronization unit 38 and a management unit 39. In synchronization unit 38 the system clock is derived. Management unit 39 performs information analysis and management functions. Both the receiver part 43 and the transmitter part 44 receive clock signals from synchronization unit 38 and information about wavelengths from processing unit 42. Transmitter part 44 and management unit 39 interact.

The optical packet node has only one common synchronization and management unit 35 for all optical packet add drop multiplexers. This saves hardware costs and generates a unique system clock.

Control unit 28 includes an inverter 32, an RX part 33, and a TX part 34. RX part 33 controls the wavelengths to be dropped in drop stage 17. RX part 33 receives the information about which wavelength has to be dropped from processing unit 42 and clock signals from receiver part 43. Inverter 32 controls the wavelengths to be forwarded in transit stage 15. Due to the principle of the inverter all wavelengths which were dropped will not be forwarded in transit stage 15. TX part 34 controls the wavelengths to be added in add stage 18. TX part 34 receives the information about which wavelength could be added from processing unit 42 and clock signals from transmitter part 44.

Optical packets are dropped and converted into electric data packets in drop stage 17. The data packets are forwarded to extraction unit 45 through receiver part 43. In the extraction unit further processing takes place. The data packets could then be transmitted to a subnetwork or a customer premises equipment.

Electric data packets to be transmitted are generated in generation unit 46. Via load balancing stage 6 these data packets could be switched to each optical packet add drop multiplexer included in the optical packet node. Load balancing stage 6 includes an electric packet switch. Through transmitter part 44 the data packets to be transmitted will be forwarded to add stage 18. In add stage 18 the electric data packets are converted into optical packets, which are transmitted on an add wavelength, e.g. a wavelength that is available for adding.

Figure 7:
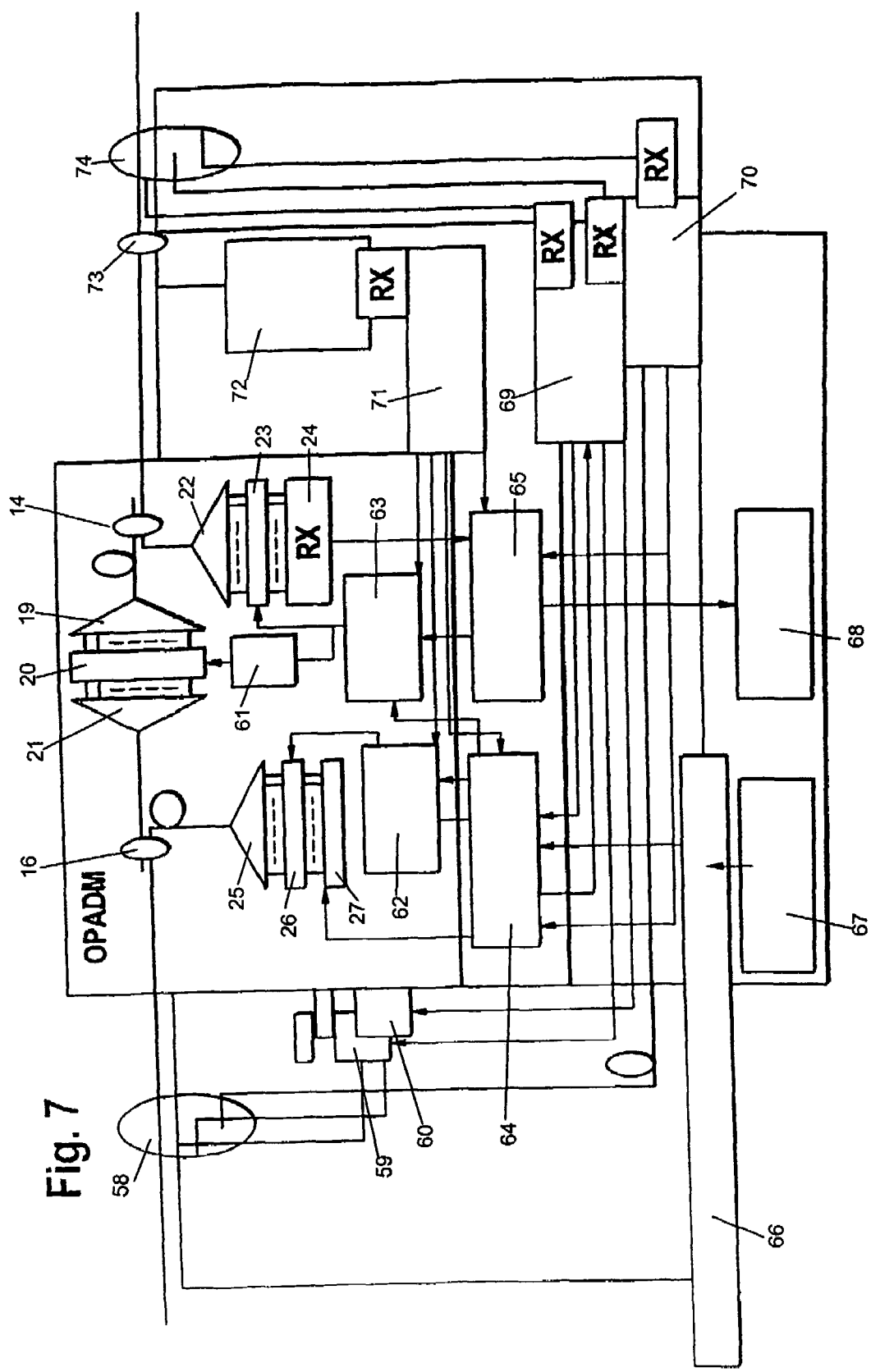
FIG. 7 shows an overview of the inventive optical packet node including a detailed diagram of an inventive optical packet add drop multiplexer.

FIG. 7 shows an overview of the inventive optical packet node including a detailed diagram of an inventive optical packet add drop multiplexer (OPADM).

Each OPADM is basically composed of:
one transit stage,
one drop stage,
one add stage.

For the drop stage three implementations could be envisaged:
1.) a demultiplexer, a photodiode array and a memory, or
2.) a wavelength selector and a photodiode, or
3.) a wavelength selector, a demultiplexer and a photodiode array.

The add stage can be composed of
1.) a tuneable source comprising a laser array, an optical gate array, a multiplexer and an external modulator, or
2.) a tuneable source and an external modulator, or
3.) a multi-wavelength source comprising an ILM array, optical gates and a multiplexer.

In FIG. 7, reference numbers from FIG. 5 are used in consistent fashion. The optical packet node has optical couplers 58, 73, 74 disposed at each end. The outputs from the optical couplers are connected to other OPADMs 59, 60. In the OPADM shown in FIG. 7, a optical packet generator 67 is coupled to a load balancing and memory circuit 66, which, in turn, is coupled to a transmit synchronizer/memory 64. The output of the transmit synchronizer/memory is coupled to a digital information transmitter 62, which is coupled to the optical gates 26. The transmit synchronizer/memory 64 is also coupled to a multi-wavelength source 27 and a digital information receiver 63. The selector 20 is connected to an inverter 61, and the inverter 61 and the photodiode array 23 are controlled by the digital information receiver 63. A receive synchronizer/memory 65 controls the digital information receiver 63, and is also connected to an information extraction resequencer 68. A synchronizer 70 outputs a signal to the transmit synchronizer/memory 64 and the receive synchronizer/memory 65. A management information analysis board 69 is connected to the transmit synchronizer/memory 64. A processor 71 performs header analysis and wavelength assignment and interface 72 is an optical parallel/serial interface.

The choice of these alternatives depends on the MAC potential and on the strategy adopted to optimise the resource utilisation. A cascade of wavelength selectors could also be used.

The processing of the transit traffic is simplified by use of a wavelength selector. The broadcasting is easy since the wavelength selector can accomodate the selection of several optical packets.

The required electrical switching capacity is reduced to 2P×2P, where P is the number of wavelength bands.

The protection is reinforced by the electrical switch capable to re-affect a new OPADM board in case of failure.

The capacity of the ring node can be increased in the optical domain independently from the electrical switching capacity: the increase of the number of wavelengths per band does not affect the switching between bands The wavelength selection technology is an existent technology and a cheaper one (high integration potential).

All the required memory is in the electrical domain.

Figure 8:
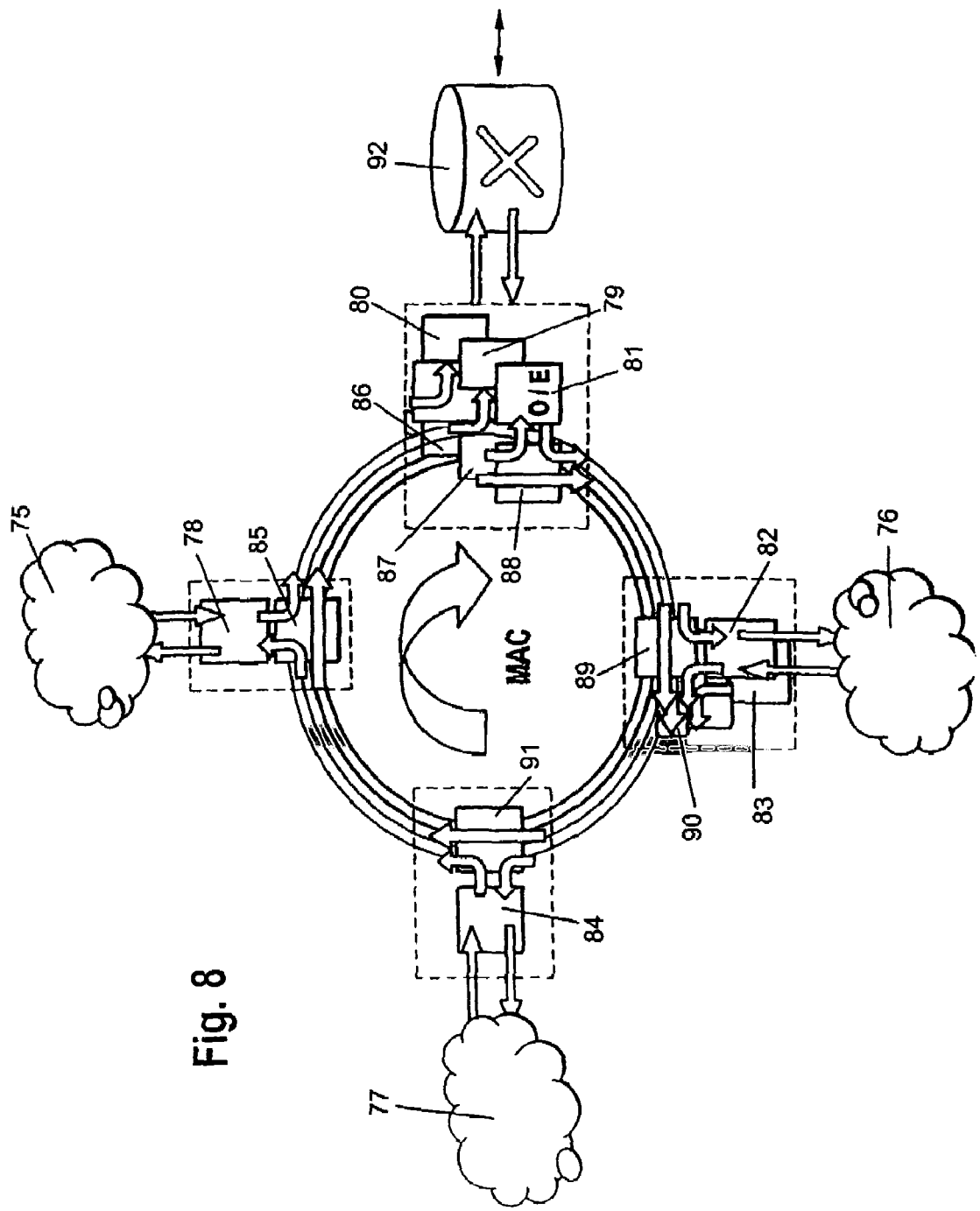
FIG. 8 shows a structure of a WDM packet ring MAN.

FIG. 8 shows a structure of a WDM packet ring MAN; WDM=wavelength division multiplex, MAN=metro access network. In order to have a flexible ring structure the proposed solution relies on two levels of flexibility:

the flexibility of optical packets in the ring in order to have a granularity for the add and the drop on the ring compatible with the requirements of data traffic. This enables to dynamically share the physical resources of the ring (wavelengths) between several ring nodes. The access to the ring is managed by a MAC protocol, and the flexibility of wavelength bands for scalability issues: ring nodes can be equipped with the same bands or with different bands. At least one ring node is equipped with all the wavelengths used on the ring to realise the wavelength conversion (intra band or inter band). This particular ring node is thus considered as the hub of the ring MAN.

In FIG. 8, networks 75, 76, 77 are legacy networks coupled to optical to electrical converters 78, 79, 80, 81, 82, 83, 84. The optical to electrical converters 78, 79, 80, 81, 82, 83, 84 are each connected to OPADMs 85, 86, 87, 99, 89, 91, which are connected to the WDM packet ring. An IP router 92 is connected to OPADMs 86, 87, 88.

The management of this WDM packet ring is done by a MAC protocol which allows to transport the optical packets between one or several ring nodes (possible support of multicast on the ring). In each ring node, incoming traffic is dropped (destination ring node) and(multicast)/or(unicast) let in transit. Some optical packets are moreover added if the MAC protocol allows it. Only the dropped traffic is converted in the electronic domain for processing, the transit traffic is kept in the optical domain.

The WDM packet ring MAN is composed of ring nodes capable to add/drop/let in transit optical packets. The access to the wavelengths of the ring is managed by a MAC protocol. The ring nodes are composed of an optical part and an electronic part. The one part realises the simple switching operation (drop/through/add), whereas the other part realises the packet format adaptation between the legacy network and the optical packet, some electronic buffering to make packets wait sending orders from the MAC protocol, and opto-electric (or electro-optical for the emitting part) conversion.

Ring nodes have a modular structure, wherein the sub-modules in the ring nodes are designed for particular wavelengths bands. Different ring nodes on the ring can be equipped with different sub-modules, but at least one ring node (considered as the hub of the ring) is equipped with all the sub-modules for the wavelength bands used on the ring. This particular ring node is linked to an IP router (IP=Internet Protocol) for the interconnection with a backbone (drop traffic MAN→WAN and add traffic WAN→MAN) and for traffic in contention on the ring.

There are two different solutions for the management of the ring:

either the MAC protocol and the IP router are independent: only the MAC protocol is used to find available resource between ring nodes. The MAC of the ring MAN is thus only a layer 1 protocol, and the IP router is used only to process the IP packets between the MAN and the WAN, and as well to re-process at the IP level some intra MAN traffic for which the end to end contention (ring node to ring node) has not been solved by the MAC.

Or, the MAC protocol is controlled by the control plane of the IP router in order to optimise the physical resource of the MAN: the MAC protocol is thus quite basic (low level control on the ring nodes) and some traffic engineering is used at the IP level (or MPLS level) to increase the performance and the reliability of the ring network.

One advantage of this new solution is that the quantity of information sent to the IP router is limited: the transport of the information between two ring nodes of the ring is transparent (no opto-electric and no electro-optical conversion for transit traffic). The Drop traffic and the Add traffic are normally processed in the edge ring nodes, plus, for the ring node(s) acting as the hub(s), the traffic in contention: this limits the size of the electronic memories and the number of opto-electric conversion required, and therefore should reduce the overall cost of the network.

This ring network is adapted to the transport of data through the use of optical packets: the physical resources can be shared between several ring nodes (and therefore several clients) which enables to reduce the cost of the connections. It is also flexible in terms of scalability thanks to the use of wavelength bands: at the beginning, ring nodes are partially equipped with few bands, and when the traffic volume increases, bands can be added in the ring nodes requiring for more capacity. This enables as well to have different ring nodes on the same ring, each with a capacity adapted to its local volume of traffic and not necessarily to all the traffic volume of the ring. At the end, all the ring nodes can be fully equipped with an obvious benefits in terms of protection (more than one hub on the ring).

Finally, this WDM packet ring is easily service oriented:

with the use of Band Cross-connects at the lower level on the ring (not represented), there is no service interruption during the upgrade of a particular ring node: the upgrade is done out-of band, VPN (Virtual Private Network) between two ring nodes is easily done, because transit traffic transparently goes through other ring nodes on the ring, The network structure is compatible with a multi-service approach as soon as the MAC protocol allows it (or combining MPLS capabilities of the IP router, used as the ring hub, and the MAC protocol).

Figure 9:
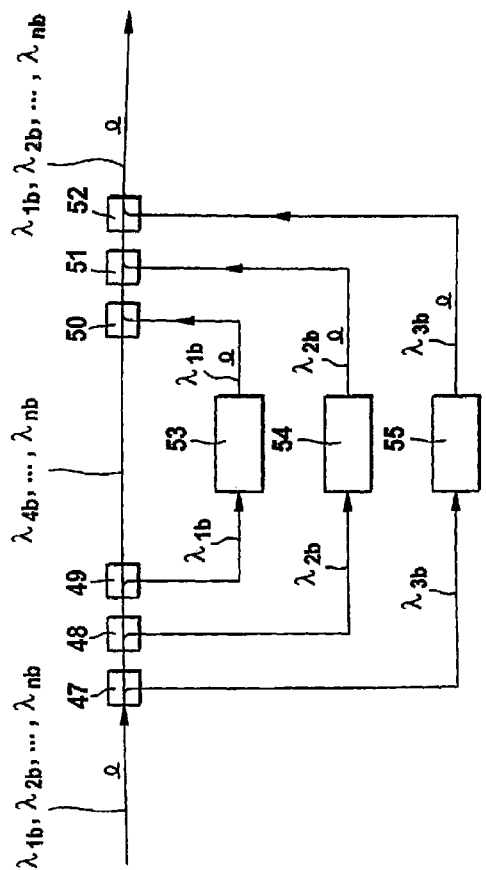
FIG. 9 illustrates an alternative embodiment of the optical access node.

FIG. 9 illustrates an alternative embodiment of the optical packet node. The optical packet node includes three optical packet add drop multiplexer modules 53, 54, 55, each for processing one multiwavelength band, the processing operations including dropping, forwarding, and adding of individual wavelengths.

The optical packet node further includes three couplers 47, 48, 49, each serving to separate one wavelength band $\lambda_{1b}, \lambda_{2b}, \lambda_{3b}$ out of a plurality of wavelength bands $\lambda_{1b}$ to $\lambda_{nb}$. Each coupler 47, 48, 49 is connected to one optical packet add drop multiplexer modules 53, 54, 55 to provide the separated multiwavelength band; $\lambda_{1b}$ to 53, $\lambda_{2b}$ to 54, and $\lambda_{3b}$ to 55.

The optical packet node further includes three couplers 50, 51, 52, each serving to couple one wavelength band $\lambda_{1b}, \lambda_{2b}, \lambda_{3b}$ and part of a plurality of wavelength bands $\lambda_{1b}$ to $\lambda_{nb}$. Each coupler 50, 51, 52 is connected to one optical packet add drop multiplexer modules 53, 54, 55 to receive the added multiwavelength band including the new optical packets; $\lambda_{1b}$ from 53, $\lambda_{2b}$ from 54, and $\lambda_{3b}$ from 55.

Couplers 49 and 50 are connected to forward those multiwavelength bands, which were not processed in the optical packet node, independent from their number, so that also in upgraded systems with more wavelengths being transmitted over the same fibre the optical packet node still works and forwards also the newly added wavelengths. The optical packet node may have a common synchronization and management unit, a common load balancing stage and a number of electric interface modules.

Figure 10:
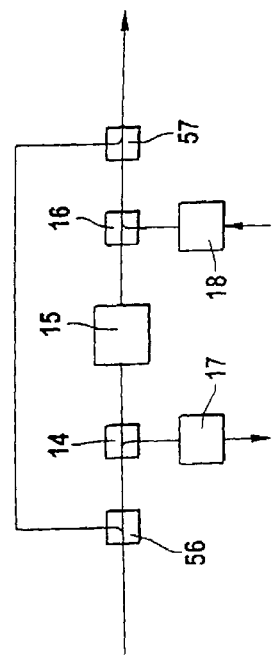
FIG. 10 illustrates an example of a more detailed diagram of the optical packet add drop multiplexer of FIG. 4.
Figure 11:
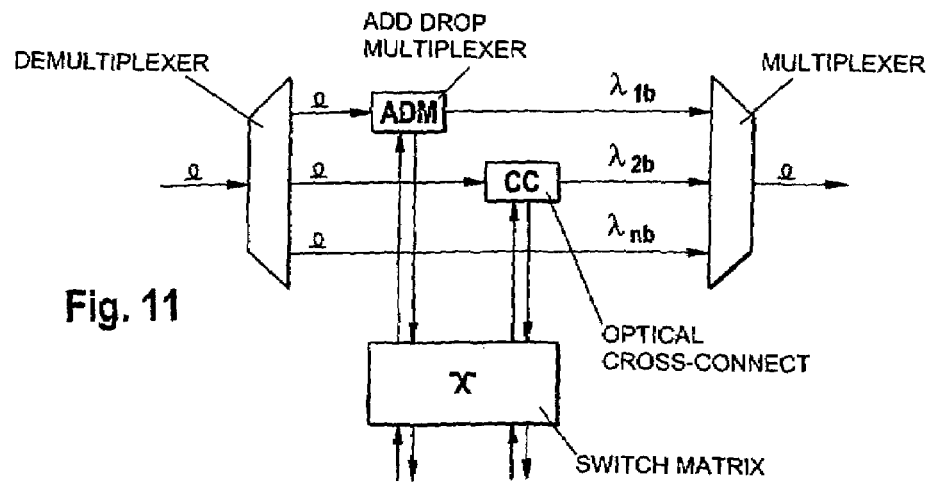
FIG. 11 and FIG. 12 show examples of ADM (add drop multiplexer) and CC (cross connect) combinations together with wavelength multiplexer and demultiplexer and a processing unit.
Figure 12:
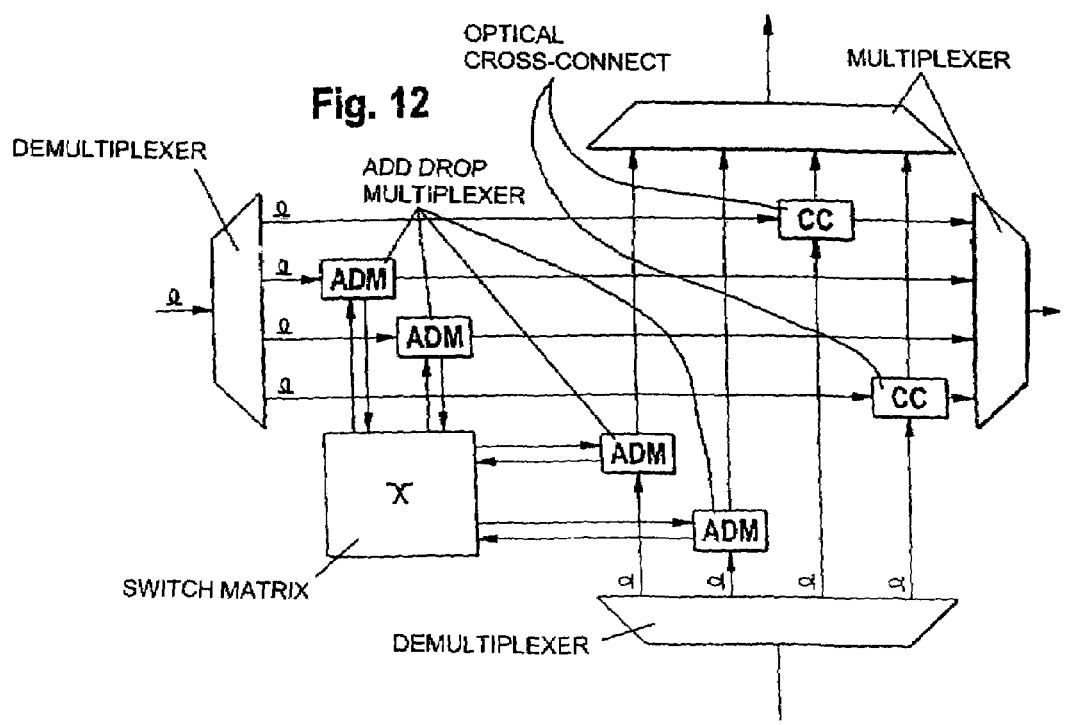

FIG. 10 illustrates an example of a more detailed diagram of the optical packet add drop multiplexer of FIG. 4. The optical packet add drop multiplexer includes transit stage 15, drop stage 17, add stage 18, and couplers 14, 16.

The optical packet add drop multiplexer further includes wavelength dependent couplers 56, 57. Coupler 56 couples out the wavelengths not to be processed in the optical packet add drop multiplexer and forwards them to coupler 57, in that way bypassing the optical packet add drop multiplexer. Coupler 56 further couples out the wavelengths to be processed in the optical packet add drop multiplexer and forwards them to coupler 14. Therefore only the wavelengths of interest, e.g. those to be dropped or added are forwarded to the optical packet add drop multiplexer. In such a way the demultipexers and multiplexers used in the optical packet add drop multiplexer could have less inputs and less outputs resulting in cost savings.

The foregoing is merely illustrative of the principles of the invention. Those skilled in the art will be able to devise numerous arrangements including combinations of embodiments, which, although not explicitly shown or described herein, nevertheless embody principles that are within the scope of the invention.

The invention claimed is:

1. An optical packet node for receiving and transmitting optical packets, said packet node comprising:
   a multiwavelength band splitting device for splitting received optical packets transmitted via multiwavelength bands into at least three groups, each group comprising one multiwavelength band,
   a multiwavelength band combining device for combining said at least three groups of multiwavelength bands,
   at least two optical packet add drop multiplexers, each optical packet add drop multiplexer placed between said multiwavelength band splitting device and said multiwavelength band combining device, and each optical packet add drop multiplexer serving to add at least one individual wavelength to a respective multiwavelength band group and to drop at least one individual wavelength from a respective multiwavelength band group, and
   a load balancing stage connected to said at least two optical packet add drop multiplexers to provide an interconnection between at least two multiwavelength wavelength band groups, wherein said load balancing stage manages traffic levels of optical packets to prevent overload by shifting selected packets from one multiwavelength band group to another multiwavelength band group, and wherein said load balancing stage stores low priority optical packets that were dropped to transmit high priority optical packets, said stored low priority optical packets being transmitted to fill gaps between high priority optical data or being transmitted over an available wavelength in a multiwavelength band group.

2. The optical packet node as claimed in claim 1, wherein said load balancing stage comprises a packet switch to provide load balancing between the data packets to be added and transmitted and the available wavelength capacity.

3. The optical packet node as claimed in claim 1, wherein said optical packet node further comprises at least two interface modules connected to the load balancing stage to provide the data packets to be added and transmitted.

4. The optical packet node as claimed in claim 1, wherein said multiwavelength band splitting device comprises a demultiplexer, a filter or a coupler, and said multiwavelength band combining device comprises a multiplexer or a combiner.

5. The optical packet node as claimed in claim 1, wherein the load balancing stage is telemetrically programmable.

6. An optical packet add drop multiplexer for receiving and transmitting optical packets and to add and to drop at least one individual wavelength to a multiwavelength band, said packet add drop multiplexer comprising:
   a drop stage to drop at least one received individual wavelength of said multiwavelength band, wherein said drop stage comprises a series connection of:
      a multiwavelength band splitting device for splitting received optical packets transmitted via said multiwavelength band into individual wavelengths, and
      a wavelength selector to select the wavelengths to be dropped and the wavelengths not to be dropped, and
   a transit stage to forward at least one received individual wavelength of said multiwavelength band, wherein said transit stage comprises a series connection of:
      a multiwavelength band splitting device for splitting received optical packets transmitted via said multiwavelength band into individual wavelengths,
      a wavelength selector to select the wavelengths to be forwarded and the wavelengths not to be forwarded, and
      a multiwavelength band combining device for combining said selected wavelengths to be forwarded, and
   an add stage to add at least one individual wavelength to said multiwavelength band, each added wavelength being unequal to each of the forwarded wavelengths, wherein said add stage comprises a series connection of:
      a wavelength selector to select the wavelengths to be added and the wavelengths not to be added, and
      a multiwavelength band combining device for combining said selected wavelengths to be added, and
      a wavelength band coupler to forward a portion of the optical signal power of the received optical packets to a first output, and to forward the remaining portion of the optical signal power to a second output, the first output connected to the transit stage and the second output connected to the drop stage, and
      a coupler to couple the output signals of the transit stage and the output signals of the add stage.

7. The optical packet add drop multiplexer as claimed in claim 6, wherein said optical packet add drop multiplexer further comprises a control unit to control the selection of the wavelengths to be dropped, the wavelengths to be forwarded, and the wavelengths to be added.

8. The optical packet node as claimed in claim 1, wherein each of said optical packet add drop multiplexers transmits and receives optical packets and comprises:
   a drop stage to drop at least one received individual wavelength of a multiwavelength band group,
   a transit stage to forward at least one received individual wavelength of said multiwavelength band group,
   an add stage to add at least one individual wavelength to said multiwavelength band group, each added wavelength being unequal to each of the forwarded wavelengths,
   a wavelength band coupler to forward a portion of the optical signal power of the received optical packets to a first output, and to forward the remaining portion of the optical signal power of the received optical packets to a second output, the first output connected to the transit stage and the second output connected to the drop stage, and a coupler to couple the output signals of the transit stage and the output signals of the add stage, wherein said optical packet add drop multiplexers are connected to a common synchronization and management unit providing synchronization and management.

9. An optical packet node for receiving and transmitting optical packets, said packet node comprising:

a multiwavelength band splitting device for splitting received optical packets transmitted via multiwavelength bands into at least three groups, each group comprising one multiwavelength band, a multiwavelength band combining device for combining said at least three groups of multiwavelength bands, at least one optical packet add drop multiplexer placed between said multiwavelength band splitting device and said multiwavelength band combining device, and said optical packet add drop multiplexer serving to add at least one individual wavelength to a respective multiwavelength band group and to drop at least one individual wavelength from a respective multiwavelength band group, and at least one optical packet cross-connect between said multiwavelength band splitting device and said multiwavelength band combining device, said at least one optical packet cross-connect serving to switch at least one individual wavelength of a respective group of a multiwavelength band, and a load balancing stage connected to said at least one optical packet add drop multiplexer to provide an interconnection between at least two multiwavelength wavelength band groups, wherein said load balancing stage manages traffic levels of optical packets to prevent overload by shifting selected packets from one multiwavelength band group to another multiwavelength band group, and wherein said load balancing stage stores low priority optical packets that were dropped to transmit high priority optical packets, said stored low priority optical packets being transmitted to fill gaps between high priority optical data or being transmitted over an available wavelength in a multiwavelength band group.

10. The optical packet node as claimed in claim 1, wherein the load balancing stage converts optical packets transmitted over a first wavelength of a multiwavelength band group to a second wavelength of another multiwavelength band group for transmission.

11. The optical packet node as claimed in claim 1, wherein said packet node further comprises at least one optical packet cross-connect.

12. The optical packet node as claimed in claim 9, wherein said at least one optical packet add drop multiplexer comprises a plurality of optical packet add drop multiplexers and at least one optical packet cross-connect comprises a plurality of optical packet cross-connects.

13. The optical packet node as claimed in claim 9, wherein the load balancing stage converts optical packets transmitted over a first wavelength of a multiwavelength band group to a second wavelength of another multiwavelength band group for transmission.

* * * * *